United States Patent [19]

Iwasaki

[11] Patent Number: 5,339,113
[45] Date of Patent: Aug. 16, 1994

[54] MOTION-AND NONSTANDARD-ADAPTIVE THREE-DIMENSIONAL YC SEPARATING CIRCUIT FOR NTSC SIGNAL

[75] Inventor: Kiyoshi Iwasaki, Tokyo, Japan

[73] Assignee: NEC Corporation, Tokyo, Japan

[21] Appl. No.: 125,733

[22] Filed: Sep. 24, 1993

[30] Foreign Application Priority Data

Sep. 28, 1992 [JP] Japan .................................. 4-282399

[51] Int. Cl.$^5$ .............................................. H04N 9/78
[52] U.S. Cl. ................................... 348/604; 348/666; 348/669
[58] Field of Search ...................... 358/31, 36, 37, 30, 358/40, 105; 348/348, 663, 665, 668, 669, 670, 558, 431, 451, 712, 713, 607, 630, 604, 666; H04N 9/77, 9/78

[56] References Cited

U.S. PATENT DOCUMENTS

| | | | |
|---|---|---|---|
| 5,155,582 | 10/1992 | Tokoi | 358/31 |
| 5,249,037 | 9/1993 | Sugiyama | 358/31 |

FOREIGN PATENT DOCUMENTS 2-174486  7/1990  Japan .

*Primary Examiner*—Victor R. Kostak
*Assistant Examiner*—Sherrie Hsia
*Attorney, Agent, or Firm*—Young & Thompson

[57] ABSTRACT

In a three-dimensional YC separating circuit including an intra-field YC separating circuit and an inter-frame YC separating circuit, when an NTSC composite video signal is nonstandard and is used for a static image part of an image, a low pass filtering is performed upon a C signal of the inter-frame YC separating circuit, and the low pass filtered C signal is added to a C signal of the intra-field YC separating circuit. Then, a Y signal is obtained by subtracting the combination of the two C signals from the NTSC composite video signal.

8 Claims, 10 Drawing Sheets

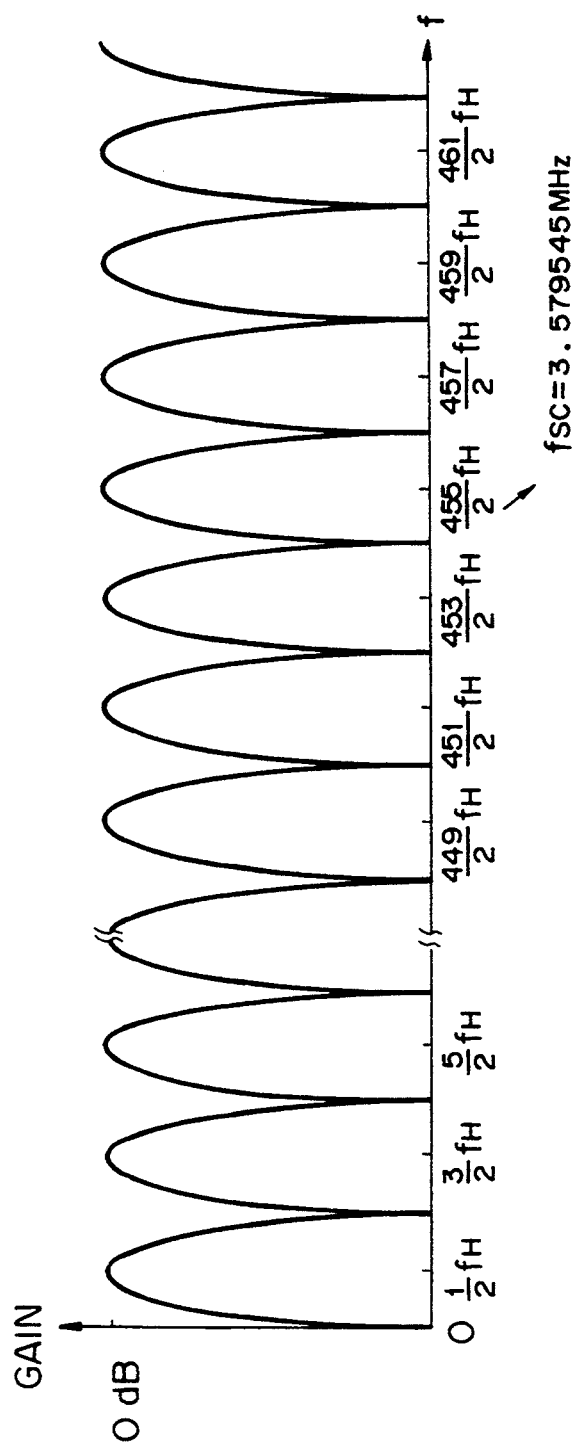

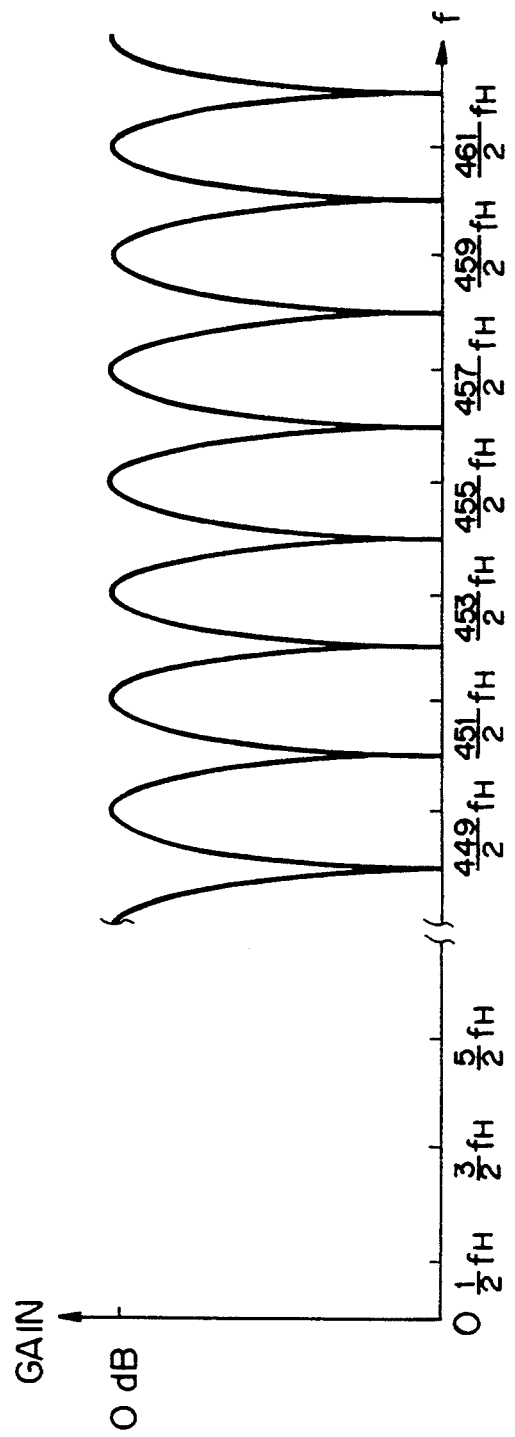

MOTION-AND NONSTANDARD-ADAPTIVE THREE-DIMENSIONAL YC SEPARATING CIRCUIT FOR NTSC SIGNAL

BACKGROUND OF THE INVENTION

1. Field of the Invention

The present invention relates to a motion-and nonstandard adaptive three-dimensional YC separating circuit for separating a National Television System Committee (NTSC) composite video signal into a luminance signal (hereinafter, referred to as a Y signal) and a chroma signal (hereinafter, referred to as a C signal).

2. Description of the Related Art

A prior art three-dimensional YC separating circuit includes an intra-field YC separating circuit using line memories and an inter-frame YC separating circuit using a frame memory.

In a static image, a correlation between two adjacent frames is strong, so that the inter-frame YC separating circuit is selected to carry out a YC separation. Conversely, in a dynamic image, a correlation between two adjacent frames is weak, so that the inter-frame YC separating circuit cannot be used, and therefore, the intra-field YC separating circuit is selected to carry out a YC separation.

In order to discriminate a dynamic image part of an image from a static image part thereof, a motion detecting circuit is provided in the prior art YC separating circuit.

Also, if an NTSC composite video signal is a standard signal used in television broadcasting, a reproduction in a laser disk player, and the like, which completely satisfies the NTSC specification, the following interleave relationship between the Y signal and the C signal is satisfied:

$$f_{SC} = 455/2 \, f_H$$
$$= 455/2 \cdot 525/2 \cdot f_V$$
$$= 3.579545 \, MHz$$

where $f_{SC}$ is a color sub-carrier frequency;
$f_H$ is a horizontal frequency; and
$f_V$ is a vertical frequency. Conversely, if the NTSC composite video signal is a nonstandard signal used in a reproduction in a home video apparatus, an output of a television game apparatus, and the like, which does not completely satisfy the NTSC specification, the above-mentioned interleave relationship is not satisfied, so that the inter-frame YC separating circuit cannot be used. Therefore, in this case, the intra-field YC separating circuit is selected to carry out a YC separation.

In order to discriminate an NTSC standard signal from an NTSC nonstandard signal, a standard/nonstandard detecting circuit is provided in the prior art three-dimensional YC separating circuit.

Thus, in the prior art three-dimensional YC separating circuit, the selection of the intra-field YC separating circuit and the inter-frame YC separating circuit is carried out as follows:

| | STATIC IMAGE | DYNAMIC IMAGE |
|---|---|---|
| STANDARD SIGNAL | INTER-FRAME | INTRA-FIELD |
| NONSTANDARD SIGNAL | INTRA-FIELD | INTRA-FIELD |

Note that the intra-field YC separating circuit has a S/N improvement effect, i.e., a noise reduction effect for only a definite frequency bandwidth, while the inter-frame YC separating circuit has a noise reduction effect for all of the frequencies, as will be explained later in detail. In the above-mentioned prior art three-dimensional YC separating circuit, however, the inter-frame YC separating circuit is used only for a standard NTSC composite video signal for a static image part of an image, and therefore, effective use is not made of the inter-frame YC separating circuit.

SUMMARY OF THE INVENTION

In a YC separating circuit including an intra-field YC separating circuit and an inter-frame YC separating circuit, an object of the present invention is to make effective use of the inter-frame YC separating circuit having a noise reduction effect for all of the frequencies.

According to the present invention, in a three-dimensional YC separating circuit including an intra-field YC separating circuit and an inter-frame YC separating circuit, when an NTSC composite video signal is non-standard and is used for a dynamic image part of an image, a low pass filtering is performed upon a C signal of the inter-frame YC separating circuit, and the low pass filtered C signal is added to a C signal of the intra-field YC separating circuit. Then, a Y signal is obtained by subtracting the combination of the two C signals from the NTSC composite video signal. Thus, a noise reduction in the Y signal can be improved.

BRIEF DESCRIPTION OF THE DRAWINGS

The present invention will be more clearly understood from the description as set forth below, in comparison with the prior art, with reference to the accompanying drawings, wherein:

FIGS. 3A, 3B and 3C are frequency characteristic diagrams for the intra-field YC separating circuit of FIG. 2;

DESCRIPTION OF THE PREFERRED EMBODIMENTS

Before the description of an embodiment of the present invention, a prior art three-dimensional YC separating circuit will be explained with reference to FIGS. 1 through 7.

Figure 1:
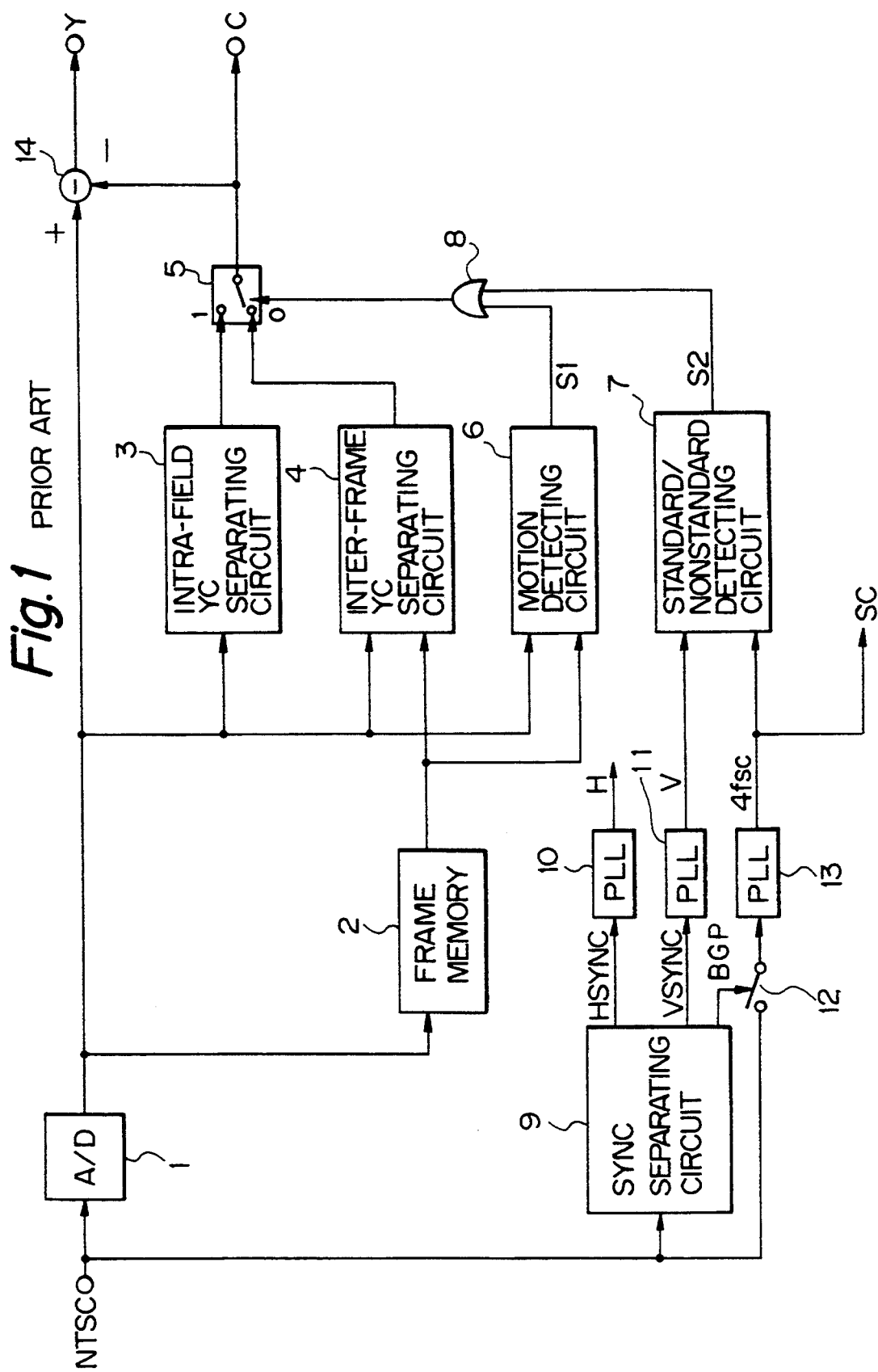
FIG. 1 is a block circuit diagram illustrating a prior art three-dimensional YC separating circuit for an NTSC composite video signal.

In FIG. 1, which illustrates a prior art three-dimensional YC separating circuit, reference numeral 1 designates an analog/digital (A/D) converter for performing an A/D conversion upon an NTSC composite video signal which is, in this case, analog. The output of the A/D converter 1, i.e., a digital NTSC composite video signal is written into a frame memory 2, to thereby delay the digital NTSC composite video signal by one frame.

In FIG. 1, two kinds of YC separating circuits, i.e., an intra-field YC separating circuit 3 and an inter-frame YC separating circuit 4 are provided. The intra-field YC separating circuit 3 uses a correlation between adjacent scan lines, and therefore, the intra-field YC separating circuit 3 includes line memories (see FIG. 2) connected to the A/D converter 1. On the other hand, the inter-frame YC separating circuit 4 uses a correlation between adjacent frames, and therefore, the inter-frame YC separating circuit 4 is connected to the A/D converter 1 which outputs a current frame and to the frame memory 2 which outputs a previous frame. One of the two YC separating circuits 3 and 4 is selected by a switch 5 which generates a C signal.

The switch 5 is controlled by a motion detecting circuit 6 and a standard/nonstandard detecting circuit 7 via an OR circuit 8.

The correlation between the adjacent frames is strong for a static image part of an image, but is weak for a dynamic image part thereof. For this purpose, a motion detecting circuit 6 is connected to the A/D converter 1 and the frame memory 2, to determine whether an inter-frame correlation between current frame data from the A/D converter 1 and previous frame data from the frame memory 2 is strong or weak. That is, if the inter-frame correlation is strong, the NTSC composite video signal is determined to be for a static image part of an image, so that the motion detecting circuit 6 generates a detection signal S1 (="0"), thus selecting the inter-frame YC separating circuit 4. On the other hand, if the inter-frame correlation is weak, i.e., if motion is detected in the NTSC composite video signal, this signal is determined to be for a dynamic image part of an image, so that the motion detecting circuit 6 generates a detection signal S1 (="1"), thus selecting the intra-field YC separating circuit 3.

Also, as stated above, if the NTSC composite video signal is nonstandard, the inter-frame YC separating circuit cannot be used. For this purpose, a standard/nonstandard detecting circuit 7 is provided. The standard/nonstandard detecting circuit 7 determines whether the NTSC composite video signal is standard or nonstandard by using a vertical synchronization pulse signal V and a system clock signal $4f_{SC}$ (=14.3 MHz). If the NTSC composite video signal is standard, the standard/nonstandard detecting circuit 7 generates a detection signal S2 (="0"), thus selecting the inter-frame YC separating circuit 4. On the other hand, if the NTSC composite video signal is nonstandard, the standard/nonstandard detecting circuit 7 generates a detection signal S2 (="1"), thus selecting the intra-field YC separating circuit 3.

Also, due to the presence of the OR circuit 8, if at least one of the detection signal S1 of the motion detecting circuit 6 and the detection signal S2 of the standard/nonstandard detecting circuit 7 is "1", the intra-field YC separating circuit 3 is selected.

Note that reference numeral 9 designates a synchronization signal separating circuit 9 which separates a horizontal synchronization signal HSYNC, a vertical synchronization signal VSYNC and a burst gate pulse signal BGP from the NTSC composite video signal. The horizontal synchronization signal HSYNC is supplied to a phase locked loop (PLL) circuit 10 which generates a horizontal synchronization pulse signal H. The vertical synchronization signal VSYNC is supplied to a PLL circuit 11 which generates the vertical synchronization pulse signal V. The burst gate pulse signal BGP is supplied to a switch 12 to thereby turn it ON, so that a color burst component of the NTSC composite video signal passes through the switch 12 to a PLL circuit 13, thus generating the system clock signal $4f_{SC}$.

In a substractor 14, a Y signal is generated by subtracting the selected C signal from the NTSC composite video signal.

Figure 2:
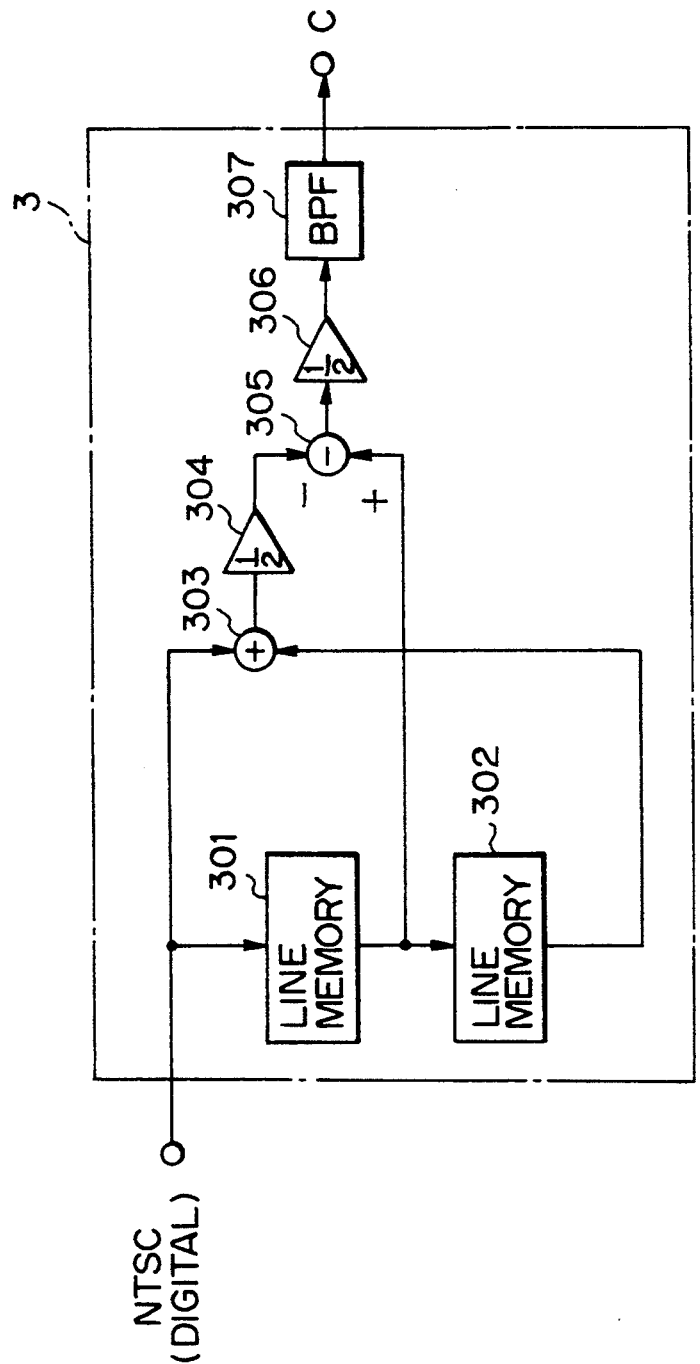
FIG. 2 is a circuit diagram of the intra-field YC separating circuit of FIG. 1.

In FIG. 2, which is a detailed circuit diagram of the intra-field YC separating circuit 3 of FIG. 1, the intra-field YC separating circuit 3 is a comb-shaped filter. That is, in a NTSC composite video signal, the phase of the C signal is inverted at every line. Also, this C signal has a frequency characteristic centered at a horizontal frequency $455/2 c_{PW}$ (=3.58 MHz) and a vertical frequency $525/4 c_{PH}$ (=2 $f_H$). Therefore, line filters 301 and 302, an adder 303, an amplifier 304, a subtractor 305 and an amplifier 306 forming a vertical filter are provided. That is, the line memory 301 delays the NTSC composite video signal by one horizontal line (1H), and the line memory 302 as well as the line memory 301 delays the NTSC composite video signal by two horizontal lines (2H). The adder 303 and the amplifier 304 calculate a mean value of the current NTSC composite video signal and the 2H delayed signal, and the subtractor 305 subtracts the mean value of the amplifier 304 from the 1H delayed signal.

A frequency characteristic of the output of the substractor 305 is shown in FIG. 3A. In other words, the vertical filter passes frequency components $\frac{1}{2}f_H$, $3/2f_H$, ... therethrough.

Figure 3B:
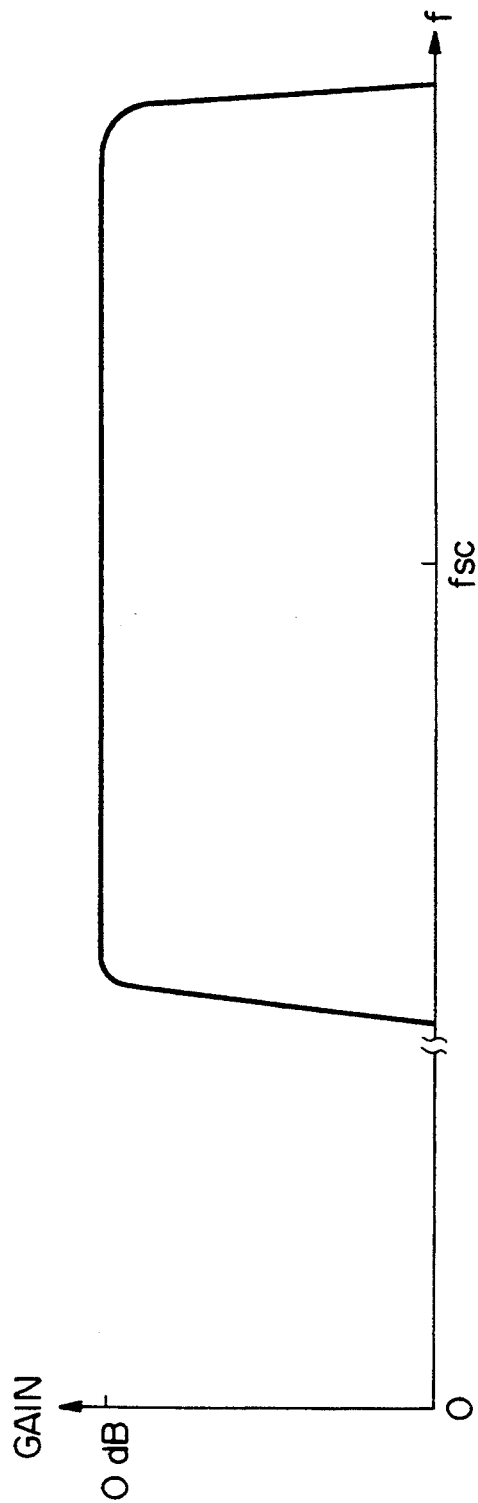

Also, in FIG. 2, a band pass filter 307 as a horizontal filter is provided. In this case, the band pass filter 307 has a frequency characteristic as shown in FIG. 3B, and therefore, the C signal of the intra-field YC separating circuit 3 of FIG. 2 has a frequency characteristic as shown in FIG. 3C. That is, although the intra-field YC separating circuit 3 uses a correlation between adjacent lines, such an inter-line correlation is weak in a low frequency region. For example, if an image depicted by the NTSC composite video signal is a longitudinal wrinkle, the inter-line correlation is strong. On the other hand, if an image depicted by the NTSC composite video signal is a lateral wrinkle, the inter-line correlation is weak. Therefore, the horizontal filter 307 is used to stop the low frequency component of the vertical filter, i.e., to stop the weak inter-line correlation signals.

Figure 4:
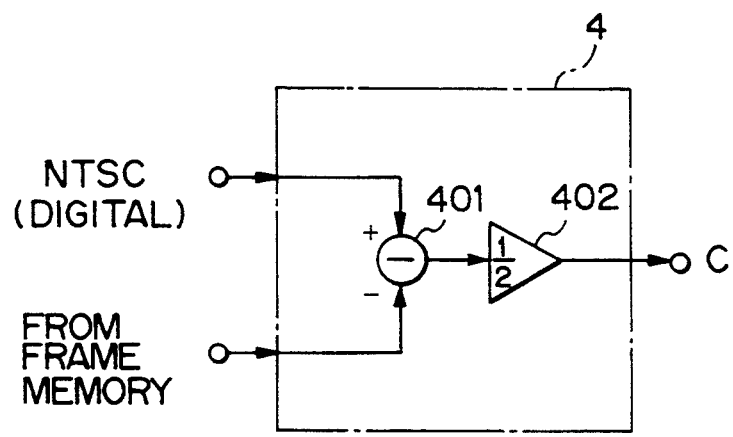
FIG. 4 is a circuit diagram of the inter-frame YC separating circuit of FIG. 1.
Figure 5:
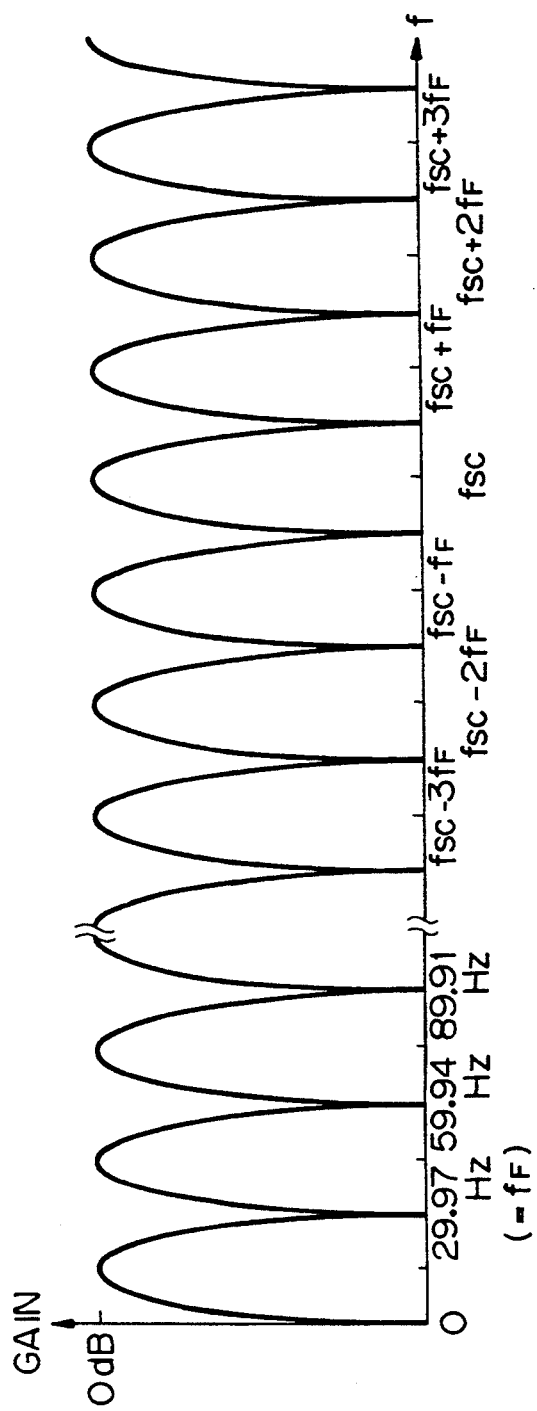
FIG. 5 is a frequency characteristic diagram for the intra-field YC separating circuit of FIG. 4.

In FIG. 4, which is detailed circuit diagram of the inter-frame YC separating circuit 4 of FIG. 1, use is made of the fact that the phase of the C signal of the NTSC composite video signal is inverted at every frame. That is, a difference between a current frame and a previous frame is calculated by a subtractor 401, and the difference signal is amplified by an amplifier 402, to thereby generate the C signal which has a frequency characteristic as shown in FIG. 5. In FIG. 5, note that $f_F$ designates a frame frequency. That is, the inter-frame YC separating circuit 4 is a kind of comb-shaped filter. Note that the correlation between adjacent frames, i.e., an inter-frame correlation is strong entirely for a static image part of an image depicted by a standard NTSC composite video signal, and therefore, a band pass filter such as the band pass filter 307 of FIG. 2 is absent in the inter-frame YC separating circuit 4.

Usually, noise is distributed in all of the frequencies. As shown in FIG. 5, the inter-frame YC separating circuit 4 passes the C signal components therethrough, and attenuates the noise for all of the frequencies, thus exhibiting the noise reduction effect for all of the frequencies. On the other hand, as shown in FIG. 3C, in the intra-field YC separating circuit 3, the low frequency component of the C signal is stopped by the band pass filter 307, and therefore, the noise reduction effect cannot be expected for the low frequency component of the C signal.

Figure 6:
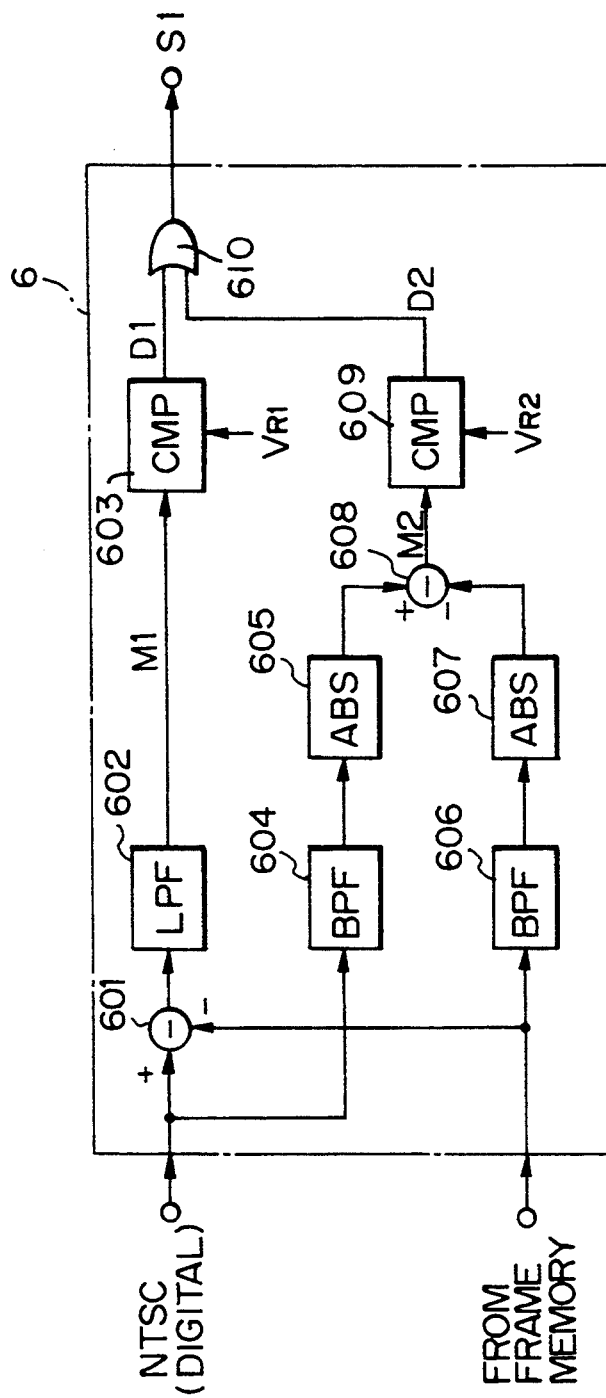
FIG. 6 is a circuit diagram of the motion detecting circuit of FIG. 1.

In FIG. 6, which is a detailed circuit diagram of the motion detecting circuit 6 of FIG. 1, a motion is detected between a current frame image and a previous frame image.

That is, a frame difference between the current NTSC composite video signal (digital) and the previous NTSC composite video signal from the frame memory 2 is calculated at a subtractor 601, and a C signal component is removed from the output of the subtractor 601 by a low pass filter 602, thus generating a motion signal M1 for the Y signal. The voltage of the motion signal M1 is compared with a reference voltage $V_{R1}$, by a comparator 603. As a result, when the voltage of the motion signal M1 is larger than the reference voltage $V_{R1}$, the comparator 603 generates a motion detection signal D1 (="1"), while, when the voltage of the motion signal M1 is not larger than the reference voltage $V_{R1}$, the comparator 603 generates a motion detection signal D1 (="0").

On the other hand, a band pass filter 604 extracts a C signal component from the current NTSC composite video signal, and an absolute value circuit 605 calculates an absolute value of this extracted C signal component. Similarly, a band pass filter 606 extracts a C signal component from the previous NTSC composite video signal from the frame memory 2, and an absolute value circuit 607 calculates an absolute value of this extracted C signal component. Note that the provision of the absolute value circuits 605 and 607 is due to the inversion of the phase of the NTSC composite video signal at every frame. Then, a frame difference between the output of the absolute value circuit 605 and the output of the absolute value circuit 607 is calculated at a subtractor 608, thus generating a motion signal M2 for the C signal. The voltage of the motion signal M2 is compared with a reference voltage $V_{R2}$ by a comparator 609. As a result, when the voltage of the motion signal M2 is larger than the reference voltage $V_{R2}$, the comparator 609 generates a motion detection signal D2 (="1"), while, when the voltage of the motion signal M2 is not larger than the reference voltage $V_{R2}$, the comparator 609 generates a motion detection signal D2 (="0").

The outputs of the comparators 603 and 609 are supplied to an OR circuit 610. Therefore, when at least one of the comparators 603 and 609 generates a motion detection signal D1 or D2 (="1"), the motion detection signal S1 (="1") is generated from the motion detecting circuit 6.

Figure 7:
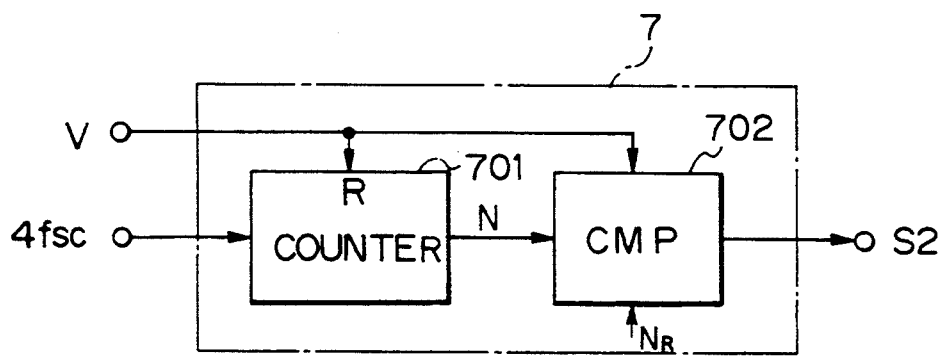
FIG. 7 is a circuit diagram of the standard/nonstandard detecting circuit of FIG. 1.

In FIG. 7, which is a detailed circuit diagram of the standard/nonstandard detecting circuit 7 of FIG. 1, a counter 701 counts the system clock signal $4f_{SC}$ and is reset by the vertical synchronization pulse signal V. Also, every time a comparator 702 receives the vertical synchronization pulse signal V, the comparator 702 compares the value N of the counter 701 with a predetermined value $N_R$ such as 59718. Note that the standard NTSC composite video signal satisfies the following formula:

$$f_{SC} = 455/2 \cdot 525/2 f_V$$
$$= 59718.75 f_V$$

Therefore, when the value N of the counter 701 coincides with $N_R$, the comparator 702 generates a detection signal S2 (="0") which means that the NTSC composite video signal is standard. Conversely, when the value N of the counter 701 does not coincide with $N_R$, the comparator 702 generates a detection signal S2 (="1") which means that the NTSC composite video signal is nonstandard.

Figure 8:
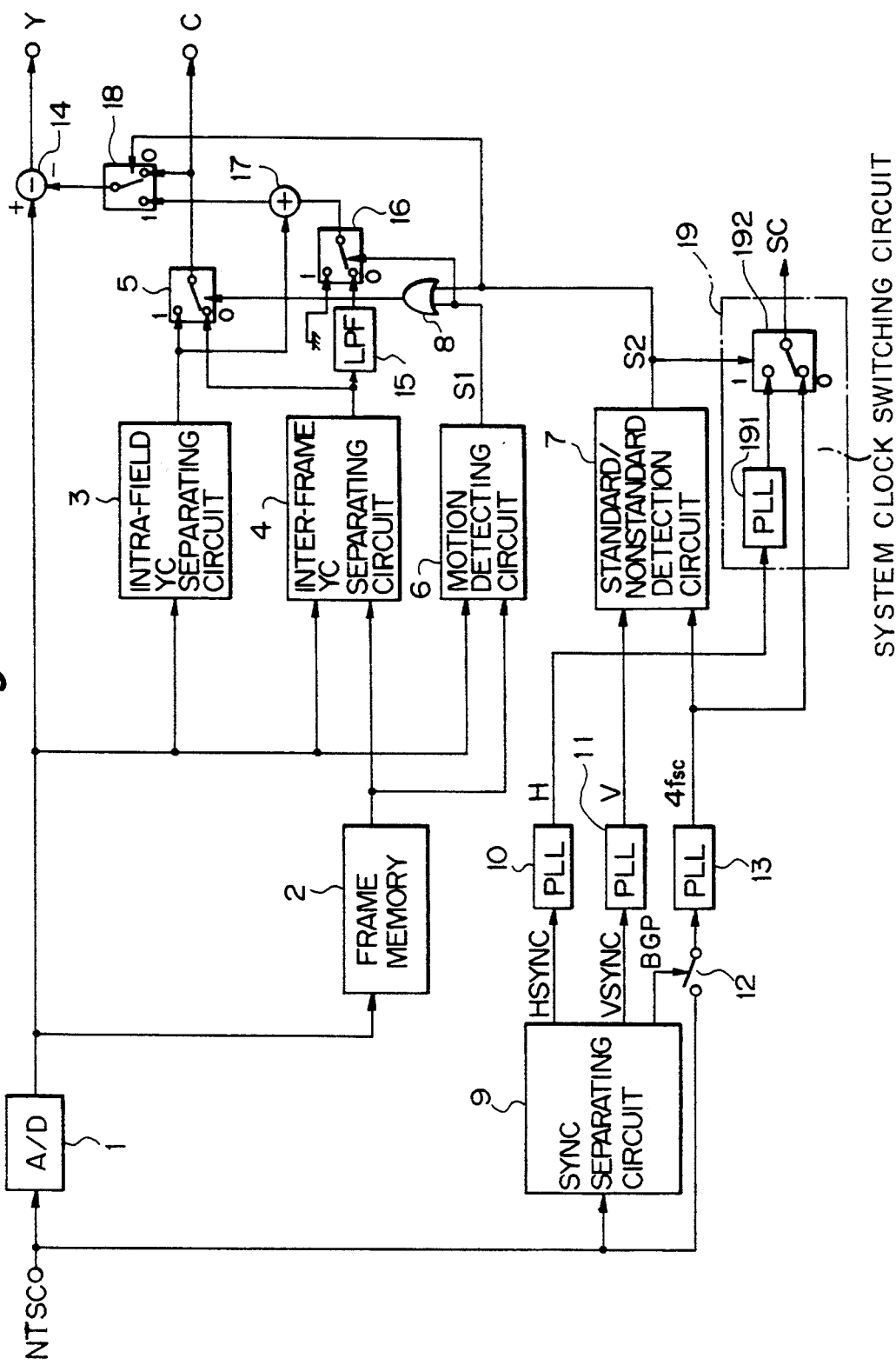
FIG. 8 is a block circuit diagram illustrating an embodiment of the three-dimensional YC separating circuit for an NTSC composite video signal according to the present invention.

In FIG. 8, which illustrates an embodiment of the present invention, a low pass filter 15, a switch 16, an adder 17, a switch 18 and a system clock switching circuit 19 are added to the elements of FIG. 1.

Figure 9:
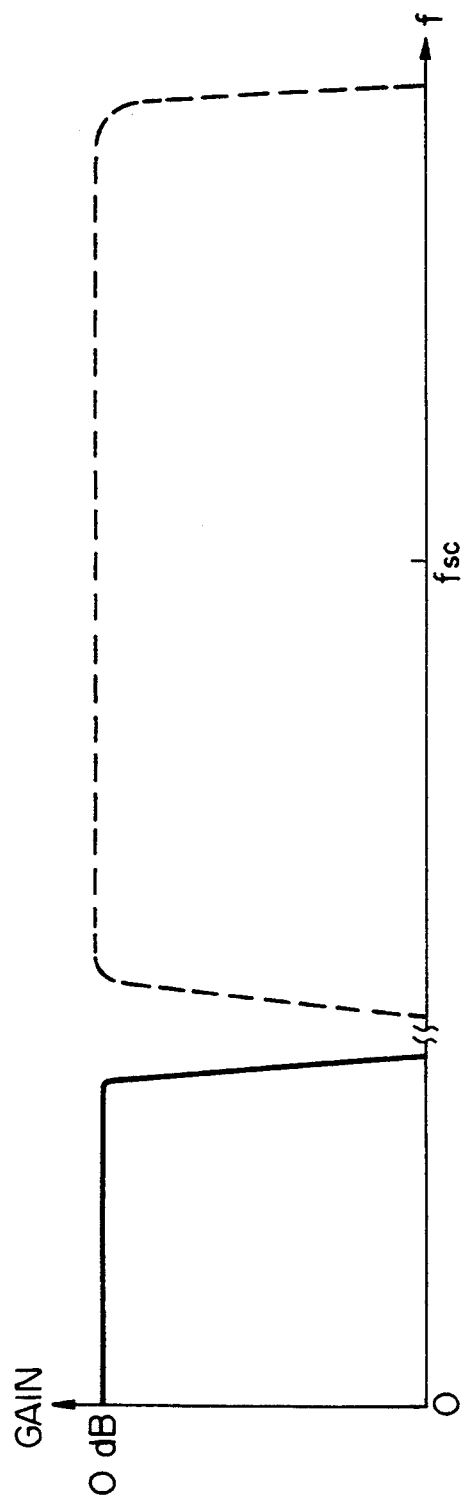
FIG. 9 is a frequency characteristic diagram of the low pass filter of FIG. 8.

The low pass filter 15 has a frequency characteristic as shown in FIG. 9. This frequency characteristic of the low pass filter 15 is not superposed onto the frequency characteristic of the band pass filter 307 of FIG. 2. In other words, a cut-off frequency of the low pass filter 15 is smaller than the lower cut-off frequency of the band pass filter 307. Therefore, since the low pass filter 15 is connected to the inter-frame YC separating circuit 4, the combination of the inter-frame YC separating circuit 4 and the low pass filter 15 has a noise reduction effect on he low frequency components of the NTSC composite video signal.

The switch 16 selects the ground level when the detection signal S1 of the motion detecting circuit 6 is "1", while the stitch 16 selects the low-pass filter 15 when the detection signal S1 of the motion detecting circuit 6 is "0".

The adder 17 adds the output of the switch 16 to the output of the intra-field YC separating circuit 3.

The switch 18 selects the output of the adder 17 when the detection signal S2 of the standard/nonstandard detecting circuit 7 is "1", while the switch 18 selects the output of the switch 5 when the detection signal S2 of the motion detecting circuit 7 is "0".

The switches 16 and 18 are controlled so as to select the intra-field YC separating circuit 3, the inter-frame YC separating circuit 4 and the adder 17 to satisfy the following relationship:

|  | STATIC IMAGE | DYNAMIC IMAGE |
| --- | --- | --- |
| STANDARD SIGNAL | INTER-FRAME | INTRA-FIELD |
| NONSTANDARD SIGNAL | INTRA-FIELD + INTER-FRAME(LPF) | INTRA-FIELD |

That is, when the NTSC composite video signal is a standard signal for a static image part of an image, i.e., when the detection signals S1 and S2 are both "0", the inter-frame YC separating circuit 4 is connected via the switches 5 and 18 to the subtractor 14. Also, when the NTSC composite video signal is a standard signal for a dynamic image part of an image, i.e., when the detection signals S1 and S2 are "1" and "0", respectively, the intra-field YC separating circuit 3 is connected via the switches 5 and 18 to the subtractor 14. Further, when the NTSC composite video signal is a nonstandard signal for a dynamic image part of an image, i.e., when the detection signals S1 and S2 are both "1", the intra-field YC separating circuit 3 is connected via the adder 17 and the switch 18 to the subtractor 14. In this case, since the switch 16 selects the ground level, the intra-field YC separating circuit 3 is substantially connected to the subtractor 18. Thus, for the above-mentioned three cases, the operation of the three-dimensional YC separating circuit of FIG. 8 is the same as that of the three-dimensional YC separating circuit of FIG. 1.

On the other hand, when the NTSC composite video signal is a nonstandard signal for a static image part of an image, i.e., when the detection signals S1 and S2 are "0" and "1", respectively, the switch 16 selects the low-pass filter 15 and the switch 18 selects the adder 17, so that a mixture of the output of the intra-field YC separating circuit 3 and the output of the inter-frame YC separating circuit 4 with a low-pass filtering are supplied via the adder 17 and the switch 18 to the subtractor 14. In this case, the low frequency component of the output of the intra-field YC separating circuit 3 having a low noise reduction effect is compensated for by the low-pass filtering component of the output of the inter-frame YC separating circuit 4. Thus, a noise reduction in the Y signal is improved for an NTSC nonstandard signal for a static image part of an image.

Also, if the NTSC composite video signal is standard, the system clock signal $4f_{SC}$ is used directly as a system clock signal SC. However, If the NTSC composite video signal is nonstandard, the system clock signal $4f_{SC}$ cannot be used. Therefore, in this case, in the clock switching circuit 19, since the synchronization pulse signal H is supplied to a PLL circuit 191 which generates a system clock signal for a nonstandard signal, the output of the PLL circuit 191 is supplied as the system clock signal SC via a switch 192 controlled by the detection signal S2 of the standard/nonstandard detecting circuit 7. As a result, when the frame memory 2 is sampled by using the system clock signal SC, the sampling number for one frame can be definite for a standard signal and a nonstandard signal. For example, the sampling number for one frame is $477750 = 910 \times 525$ where $4f_{SC} = 14.3$ MH$_z$.

As explained hereinbefore, according to the present invention, a noise reduction effect in the Y signal can be improved for a nonstandard signal in a static image.

I claim:

1. A three-dimensional YC separating circuit for separating an NTSC composite video signal into a Y signal and a C signal, comprising:

an intra-field YC separating circuit for receiving said NTSC composite video signal to generate a first C signal having a definite frequency bandwidth;

an inter-frame YC separating circuit for receiving said NTSC composite video signal to generate a second C signal;

a low pass filter connected to an output of said inter-frame YC separating circuit, said low pass filter having a cut-off frequency smaller than a lower cut-off frequency of said definite frequency bandwidth;

an adder, connected to an output of said intra-field YC separating circuit and an output of said low pass filter, to generate an output;

a motion detecting circuit for receiving said NTSC composite video signal to detect whether said NTSC composite video signal is for a static image part of an image or for a dynamic image part thereof;

a standard/nonstandard detecting circuit for receiving said NTSC composite video signal to detect whether said NTSC composite video signal is standard or nonstandard; and a subtractor, connected to said adder, for subtracting the output of said adder from said NTSC composite video signal to generate said Y signal, when said NTSC composite video signal is detected as a nonstandard signal by said standard/nonstandard detecting circuit and detected as said static image part of said image by said motion detecting circuit.

2. A three-dimensional YC separating circuit for separating an NTSC composite video signal into a Y signal and a C signal, comprising:

a frame memory for receiving said NTSC composite video signal and delaying it by one frame to generate a delayed NTSC composite video signal;

an intra-field YC separating circuit for receiving said NTSC composite video signal to generate a first C signal having a definite frequency bandwidth;

an inter-frame YC separating circuit for receiving said NTSC composite video signal and said delayed NTSC composite video signal to generate a second C signal;

a low pass filter connected to said inter-frame YC separating circuit, said low pass filter having a cut-off frequency smaller than a lower cut-off frequency of said definite frequency bandwidth;

an adder, connected to said intra-field YC separating circuit and said low pass filter, for adding an output of said low pass filter to said first C signal to generate a third C signal;

a motion detecting circuit for receiving said NTSC composite video signal and said delayed NTSC composite video signal to detect a motion by comparing said NTSC composite video signal with said delayed NTSC composite video signal;

a standard/nonstandard detecting circuit for receiving said NTSC composite video signal to detect whether said NTSC composite video signal is standard or nonstandard;

a first selecting means, connected to said intra-field YC separating circuit, said inter-frame YC separating circuit, said motion detecting circuit and said standard/nonstandard detecting circuit, for selecting said first C signal as said C signal when said NTSC composite video signal is detected to be nonstandard or for a dynamic image part of an image, and for selecting said second C signal as said C signal when said NTSC composite video signal is detected to be standard for a static image part of an image;

a second selecting means, switchingly connected to said intra-field YC separating circuit and said inter-frame YC separating circuit through said first selecting means, said adder, and said standard/nonstandard detecting circuit, for selecting said first C signal when said motion is detected, for selecting said second C signal when said motion is not detected and said NTSC composite video signal is standard, and for selecting said third C signal when said motion is not detected and said NTSC composite video signal is nonstandard; and a subtractor, connected to said second selecting means, for subtracting a selected C signal by said second selecting means from said NTSC composite video signal to generate said Y signal.

3. A three-dimensional YC separating circuit for separating an NTSC composite video signal into a Y signal and a C signal, comprising:

a frame memory for receiving said NTSC composite video signal and delaying it by one frame to generate a delayed NTSC composite video signal;

an intra-field YC separating circuit for receiving said NTSC composite video signal to generate a first C signal having a definite frequency bandwidth;

an inter-frame YC separating circuit for receiving said NTSC composite video signal and said delayed NTSC composite video signal to generate a second C signal;

a low pass filter connected to said inter-frame YC separating circuit, said low pass filter having a cut-off frequency smaller than a lower cut-off frequency of said definite frequency bandwidth;

a motion detecting circuit for receiving said NTSC composite video signal and said delayed NTSC composite video signal to detect a motion by comparing said NTSC composite video signal with said delayed NTSC composite video signal, to thereby generate a motion detection signal;

a standard/nonstandard detecting circuit for receiving said NTSC composite video signal to detect whether said NTSC composite video signal is standard or nonstandard to thereby generate a nonstandard detection signal;

an OR circuit connected to said motion detecting circuit and said standard/nonstandard detecting circuit;

a first switch, connected to said intra-field YC separating circuit and said inter-frame YC separating circuit, said first-switch being controlled by said OR circuit so that said first switch selects said first C signal as said C signal when said OR circuit generates a logic "1" and for selecting said second C signal as said C signal when said OR circuit generates a logic "0";

a ground terminal;

a second switch connected to said ground terminal and said low pass filter, said second switch being controlled by said motion detecting circuit so that said second switch selects the ground terminal when said motion is detected and selects said low pass filter when said motion is not detected;

an adder, connected to said intra-field YC separating circuit and said second switch, for adding an output of said second switch to said first C signal to generate a third C signal;

a third switch connected to said adder and said first switch, said third switch being controlled by said standard/nonstandard detecting circuit, so that said third switch selects said adder when said NTSC composite video signal is nonstandard and selects said first switch when said NTSC composite video signal is standard; and a subtractor, connected to said third switch, for subtracting an output of said third switch from said NTSC composite video signal, to thereby generate said Y signal.

4. A three-dimensional YC separating circuit as set forth in claim 3, further comprising a system clock switching circuit, connected to said standard/nonstandard detecting circuit, for selecting a first system clock signal regenerated by a color burst component of said NTSC composite video signal when said NTSC composite video signal is standard and for selecting a second system clock signal regenerated by a horizontal synchronization signal of said NTSC composite video signal when said NTSC composite video signal is nonstandard, said frame memory being clocked by a selected system clock signal.

5. A three-dimensional YC separating circuit as set forth in claim 3, wherein said intra-field YC separating circuit comprises:

a first line memory for receiving said NTSC composite video signal to generate a first delayed NTSC composite video signal;

a second line memory, connected to said first line memory, for generating as second delayed NTSC composite video signal;

a means value calculating circuit, connected to said second line memory, for calculating a means value of said NTSC composite video signal and said second delayed NTSC composite video signal;

a subtractor, connected to said mean value calculating circuit and said first line memory, for calculating a difference between said means value and said first delayed NTSC composite video memory; and a band pass filter connected to said subtractor, said band pass filter having said definite frequency bandwidth.

6. A three-dimensional YC separating circuit as set forth in claim 3, wherein said inter-frame YC separating circuit comprises a subtractor means, connected to said frame memory, for calculating a difference between said NTSC composite video signal and said delayed NTSC composite video signal.

7. A three-dimensional YC separating circuit as set forth in claim 3, wherein said motion detecting circuit comprises:

a first motion detecting circuit, connected to said frame memory, for detecting said motion for said Y signal;

a second motion detecting circuit, connected to said frame memory, for detecting said motion for said C signal; and an OR circuit connected to said first and second motion detecting circuits.

8. A three-dimensional YC separating circuit as set forth in claim 3, wherein said standard/nonstandard detecting circuit comprises:

a counter for counting a system clock signal regenerated by a color burst component of said NTSC composite video signal, said counter being reset by a vertical synchronization pulse signal regenerated by a vertical synchronization signal of said NTSC composite video signal; and a comparator, connected to said counter, for comparing a value of said counter with a predetermined value.

* * * * *